US007716083B1

(12) United States Patent
Stouvenot

(10) Patent No.: US 7,716,083 B1

(45) Date of Patent: May 11, 2010

(54) APPARATUS AND METHOD FOR DELIVERING FRESHLY-PREPARED FINE FOOD

(75) Inventor: Gilbert J. Stouvenot, Las Vegas, NV (US)

(73) Assignee: Fine Food-to-Go, Inc., Las vegas, NV (US)

( * ) Notice: Subject to any disclaimer, the term of this patent is extended or adjusted under 35 U.S.C. 154(b) by 1280 days.

(21) Appl. No.: 11/056,087

(22) Filed: Feb. 10, 2005

Related U.S. Application Data

(60) Provisional application No. 60/544,643, filed on Feb. 13, 2004.

(51) Int. Cl.
*G06Q 30/00* (2006.01)

(52) U.S. Cl. .......................................... 705/26; 705/27

(58) Field of Classification Search .................. 705/15, 705/16, 22, 26, 27
See application file for complete search history.

(56) References Cited

U.S. PATENT DOCUMENTS 1,683,889 A 9/1928 Hayne
2,543,524 A 2/1951 Oliveira
2,591,151 A 4/1952 Hansen et al.
2,883,835 A 4/1959 Pikey
3,130,288 A 4/1964 Monaco et al.
3,353,886 A 11/1967 Tompkins
3,410,109 A 11/1968 Maryland
3,516,218 A 6/1970 Eisler
3,536,132 A 10/1970 Pecoraro
3,633,381 A 1/1972 Haaf et al.
3,805,018 A 4/1974 Luong et al.
3,952,794 A 4/1976 Spanoudis
4,057,951 A * 11/1977 Schneider ...................... 53/55
4,182,405 A * 1/1980 Hysen et al. ............... 165/48.1
4,570,800 A 2/1986 Luckett
4,904,848 A 2/1990 Colevas
5,052,369 A 10/1991 Johnson
5,082,115 A 1/1992 Hutcheson
5,111,664 A 5/1992 Yang
5,297,616 A 3/1994 Pralus (Continued)

OTHER PUBLICATIONS

Walsh, Diana and Gregory Lewis; "S.F. guarantees delivery Supervisors vote to mak it illegal for businesses advertising citywide delivery to avoid taking their pizzas, flowers and newspapers to crime-plagued areas"; San Francisco Examiner; Second Editions; May 29, 1996; p. A1.*

(Continued)

*Primary Examiner*—Elaine Gort
(74) *Attorney, Agent, or Firm*—Robert M Hunter

(57) ABSTRACT

A food service system and method utilizing a food carrier for the delivery of high quality meals that are hot and safe to eat. The food carrier preferably comprises a body having an interior, an exterior and an opening, said interior defining a compartment; sealing means disposed around said opening; a door that covers said opening, said door being configured to seal against said sealing means when a partial vacuum or pressure is created in said compartment; a passageway connecting said interior and said exterior; a valve on said passageway; and a dish configured to fit within said compartment. The method comprises collecting data on favorite prepared foods from pre-registered households in predetermined communities and utilizing the data to purchase, prepare and deliver, with the utmost convenience utilizing the food carrier, ready-to-eat dishes at affordable prices.

15 Claims, 15 Drawing Sheets

Welcome Registered Household 110
View This Week's Menu: 111
Ordering for the Week of 8-14 112
Vote For Your Favorite Week of: March 15-21 115
Guest Chef Specials: 140 Date: 1 Date: 2

Number of Duet Meals Delivery Time:
Monday March 8 Fricassee of Chicken Breast with Garlic, White Mushrooms and Sun Dried Tomato, Wild Rice with Raisins, Broccoli Florets, Steamed Baby Corn 113 4:30 5:00 5:30 6:00 6:30 7:00 7:30 8:00 8:30 114
Tuesday March 9 Old Fashioned Yankee Pot Roast of Beef, Garlic Mashed Potato, Braised Carrots, Julienne of Celery, Sautéed Green Beans 4:30 5:00 5:30 6:00 6:30 7:00 7:30 8:00 8:30
Wednesday March 10 Tortellini Marinara Gratinee with Mozzarella Cheese, Served with Baked Eggplant, Broccoli Parmesan, Grilled Herbed Yellow Squash 4:30 5:00 5:30 6:00 6:30 7:00 7:30 8:00 8:30
Thursday March 11 Half Chicken BBQ New Orleans Style, Skinless and Partially Boned, Cajun Sauce, Jambalaya Rice, Stewed Tomato Braised Onions, Grilled Zucchini 4:30 5:00 5:30 6:00 6:30 7:00 7:30 8:00 8:30
Friday March 12 Baked Atlantic Salmon with Lemon Dill Sauce, Garlic Mashed Yukon Gold Potatoes, Carrots in Ginger, Sautéed Fresh Spinach Leafs and Artichoke 4:30 5:00 5:30 6:00 6:30 7:00 7:30 8:00 8:30
Saturday March 13 Roasted USDA Choice New York Strip Loin, Béarnaise Sauce, Bouquetiere of Vegetables and Rissole Red Skin Potato 4:30 5:00 5:30 6:00 6:30 7:00 7:30 8:00 8:30
Sunday March 14 Turkey Tender Braised with a Sage Dressing and a Light Giblet Gravy, Mashed Potato, Puree of Yellow Turnip, Golden Corn and Green Peas 4:30 5:00 5:30 6:00 6:30 7:00 7:30 8:00 8:30
View Total 118
Pay Exit 120

Home Page 100
Welcome Registered Household 110
Vote for Your Favorites: Following Week March 15-21 115
Please Vote by Clicking on Your Favorite 7 Duet Meals to be placed on the Menu Week of March 15-21 115
1. Half Chicken BBQ New Orleans Style, Skinless and Partially Boned, Cajun Sauce, Jambalaya Rice, Stewed Tomato Braised Onions, Grilled Zucchini
2. Old Fashioned Yankee Pot Roast of Beef, Garlic Mashed Potato, Braised Carrots, Julienne of Celery, Sautéed Green Beans
3. Tortellini Marinara Gratinee with Mozzarella Cheese, Served with Baked Eggplant, Broccoli Parmesan, Grilled Herbed Yellow Squash
4. Baked Three White Meat Loaf, Turkey, Chicken and Veal with a Mushroom Sauce, Macaroni au-Gratin, Braised Escarole, Buttered Baby Corn and Tomato
5. Turkey Tender Braised with a Sage Dressing and a Light Goblet Gravy, Mashed Potato, Puree of Yellow Turnip, Golden Corn and Green Beans
6. Alaska Filet of Halibut Meuniere, Lemon Butter Sauce, With Caramelized Onions, Julienne of Sautéed Three Peppers, Green Asparagus and Boiled Potato
7. Roasted USDA Choice New York Strip Loin, Béarnaise Sauce, Bouquetiere of Vegetables and Rissole Red Skin Potato
8. Braised Fresh Leg of Pork Polonaise Style with Sweet and Sour White and Red Cabbage, Candied Yams, Creamed Corn and Potato Pancake
9. Petit Filet Mignon with Béarnaise Sauce and Chicken Breast with a Wild Mushroom Sauce Accompanied by Parsley Potatoes and Steamed Vegetables

U.S. PATENT DOCUMENTS

| | | | | |
|---|---|---|---|---|
| 5,485,921 | A * | 1/1996 | Tolendano | 206/545 |
| 5,497,883 | A | 3/1996 | Monetti | |
| 5,523,854 | A * | 6/1996 | Hornsby | 358/407 |
| 5,598,713 | A | 2/1997 | Bartilucci | |
| 5,711,164 | A | 1/1998 | Slack | |
| 6,047,327 | A * | 4/2000 | Tso et al. | 709/232 |
| 2002/0147654 | A1* | 10/2002 | Kraisser et al. | 705/26 |
| 2003/0225731 | A1* | 12/2003 | Vidgen | 707/1 |
| 2004/0177009 | A1* | 9/2004 | Schrenk | 705/27 |

OTHER PUBLICATIONS

Precision Marketing; "DM SHOW : Site vision"; London; Oct. 17, 2003; p. P.S. 11.*

Wexler, Celia Viggo; "Samaritan Hospital Puts New Spin on Promise of Prompt Care"; Capital District Business Review; Albany; Jun. 27, 1988; vol. 15 Iss. 11; Sec. 1. p. 1.*

* cited by examiner

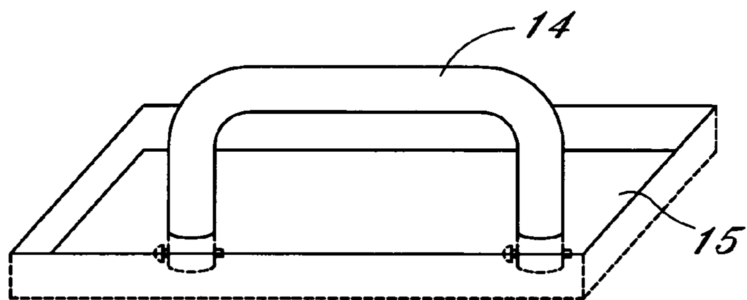
FIG. 6
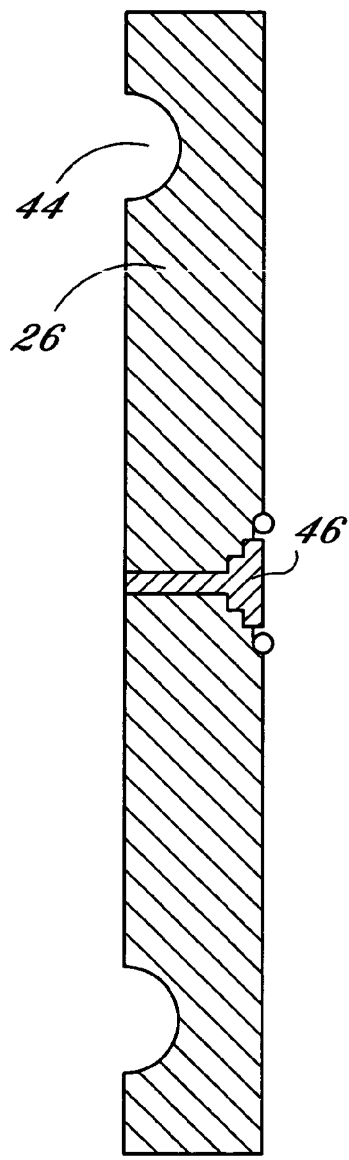
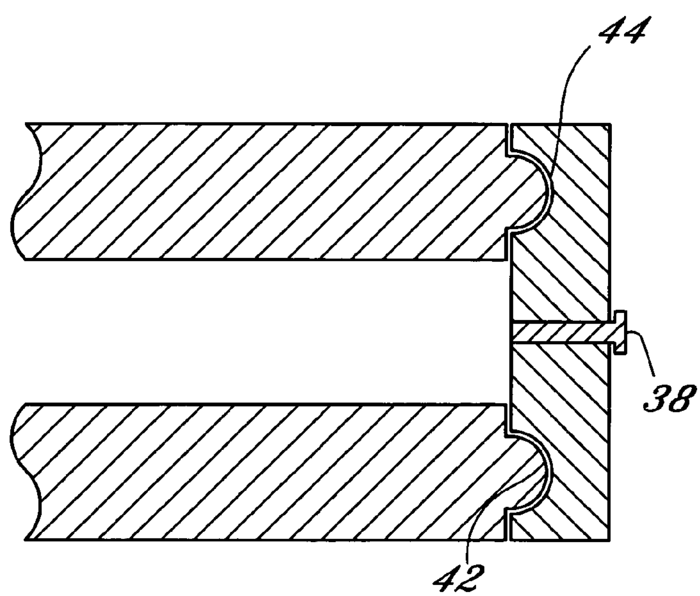
FIG. 7
FIG. 8

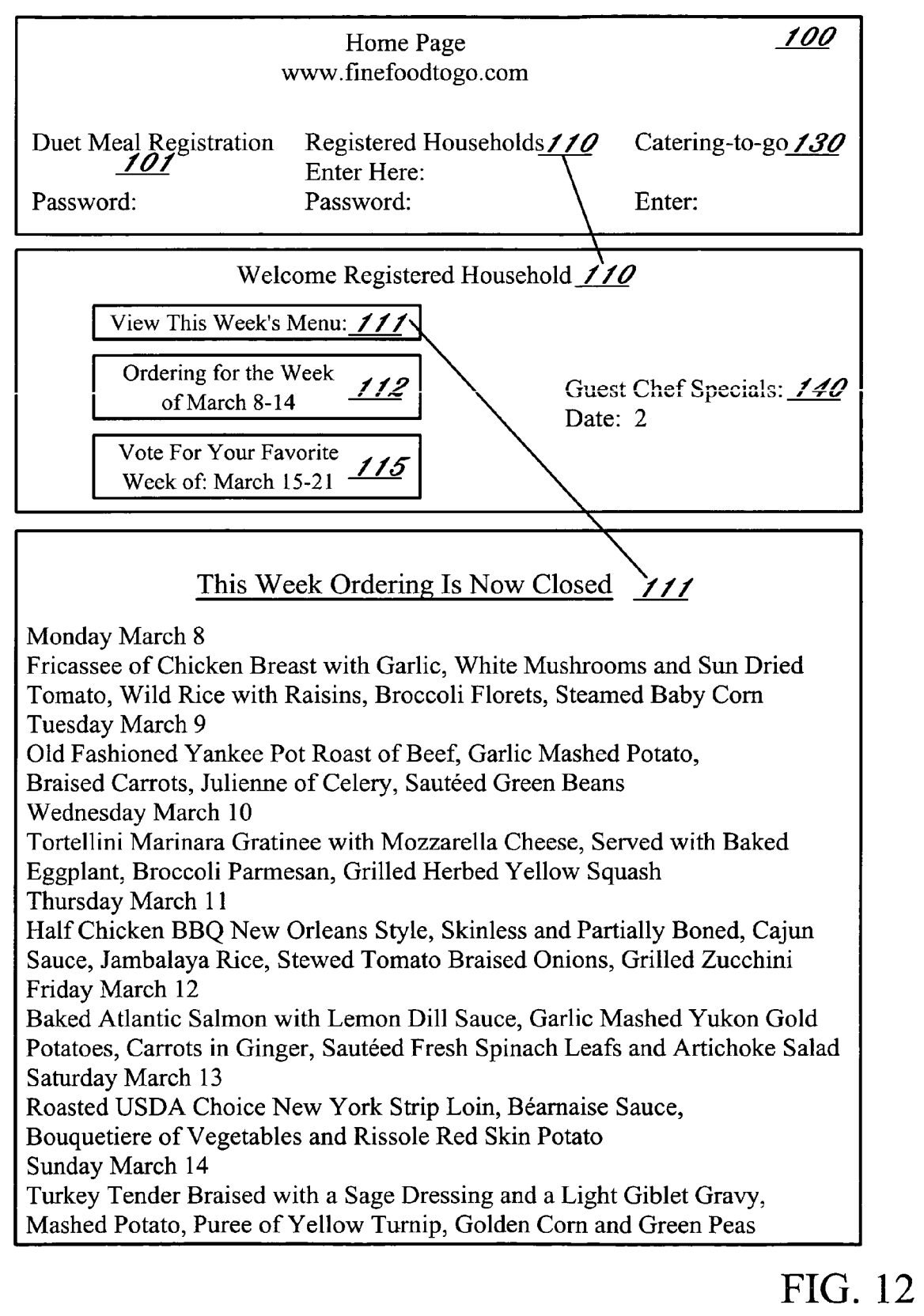

Home Page 100
www.finefoodtogo.com

Duet Meal Registration 101
Password:

Registered Households 110
Enter Here:
Password:

Catering-to-go 130
Enter:

Welcome Registered Household 110

View This Week's Menu: 111

Ordering for the Week of March 8-14 112

Vote For Your Favorite Week of: March 15-21 115

Guest Chef Specials: 140
Date: 2

This Week Ordering Is Now Closed 111

Monday March 8
Fricassee of Chicken Breast with Garlic, White Mushrooms and Sun Dried Tomato, Wild Rice with Raisins, Broccoli Florets, Steamed Baby Corn
Tuesday March 9
Old Fashioned Yankee Pot Roast of Beef, Garlic Mashed Potato, Braised Carrots, Julienne of Celery, Sautéed Green Beans
Wednesday March 10
Tortellini Marinara Gratinee with Mozzarella Cheese, Served with Baked Eggplant, Broccoli Parmesan, Grilled Herbed Yellow Squash
Thursday March 11
Half Chicken BBQ New Orleans Style, Skinless and Partially Boned, Cajun Sauce, Jambalaya Rice, Stewed Tomato Braised Onions, Grilled Zucchini
Friday March 12
Baked Atlantic Salmon with Lemon Dill Sauce, Garlic Mashed Yukon Gold Potatoes, Carrots in Ginger, Sautéed Fresh Spinach Leafs and Artichoke Salad
Saturday March 13
Roasted USDA Choice New York Strip Loin, Béarnaise Sauce, Bouquetiere of Vegetables and Rissole Red Skin Potato
Sunday March 14
Turkey Tender Braised with a Sage Dressing and a Light Giblet Gravy, Mashed Potato, Puree of Yellow Turnip, Golden Corn and Green Peas

FIG. 12

Figure 14B:
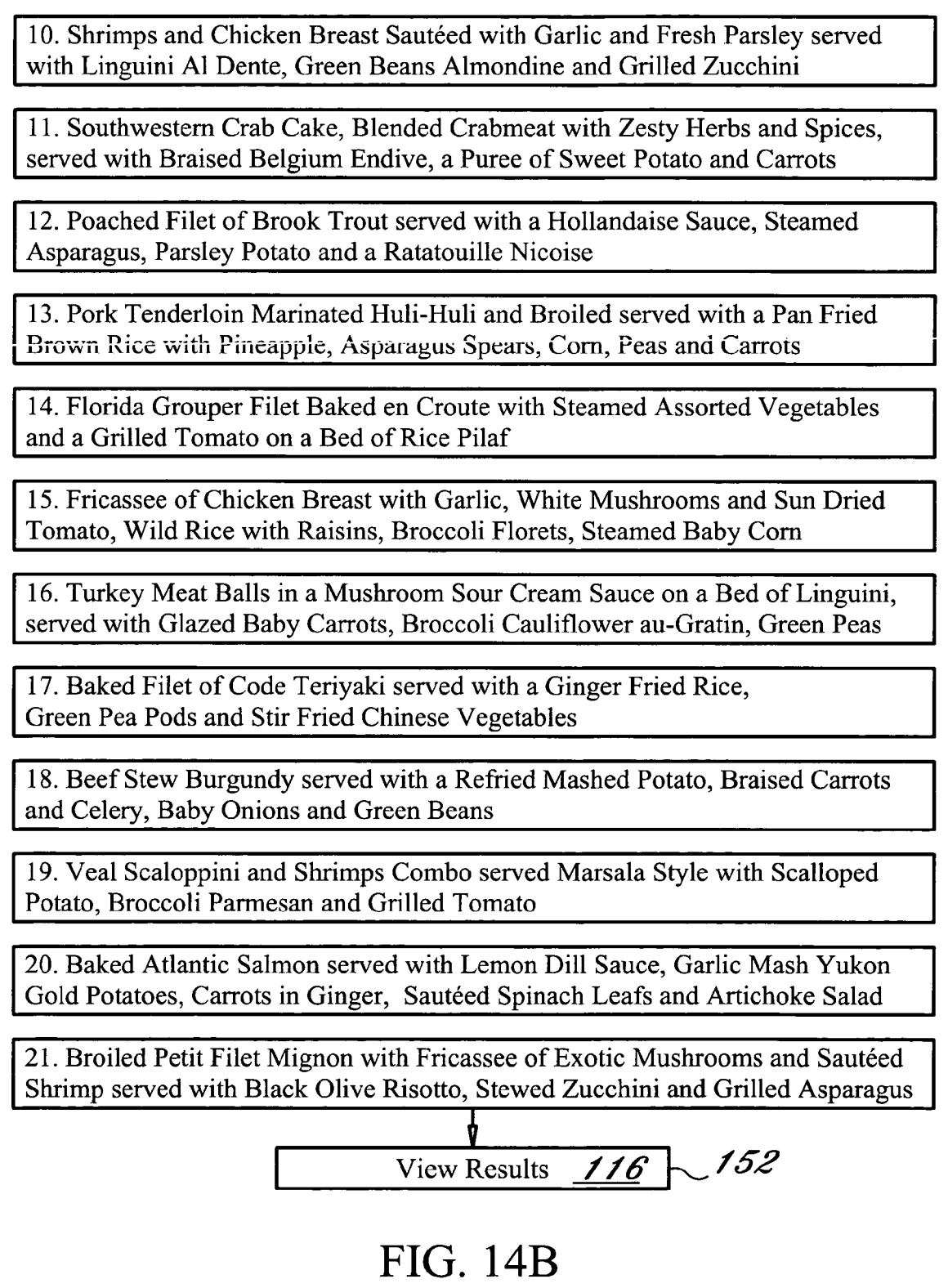

10. Shrimps and Chicken Breast Sautéed with Garlic and Fresh Parsley served with Linguini Al Dente, Green Beans Almondine and Grilled Zucchini 11. Southwestern Crab Cake, Blended Crabmeat with Zesty Herbs and Spices, served with Braised Belgium Endive, a Puree of Sweet Potato and Carrots 12. Poached Filet of Brook Trout served with a Hollandaise Sauce, Steamed Asparagus, Parsley Potato and a Ratatouille Nicoise 13. Pork Tenderloin Marinated Huli-Huli and Broiled served with a Pan Fried Brown Rice with Pineapple, Asparagus Spears, Corn, Peas and Carrots 14. Florida Grouper Filet Baked en Croute with Steamed Assorted Vegetables and a Grilled Tomato on a Bed of Rice Pilaf 15. Fricassee of Chicken Breast with Garlic, White Mushrooms and Sun Dried Tomato, Wild Rice with Raisins, Broccoli Florets, Steamed Baby Corn 16. Turkey Meat Balls in a Mushroom Sour Cream Sauce on a Bed of Linguini, served with Glazed Baby Carrots, Broccoli Cauliflower au-Gratin, Green Peas 17. Baked Filet of Code Teriyaki served with a Ginger Fried Rice, Green Pea Pods and Stir Fried Chinese Vegetables 18. Beef Stew Burgundy served with a Refried Mashed Potato, Braised Carrots and Celery, Baby Onions and Green Beans 19. Veal Scaloppini and Shrimps Combo served Marsala Style with Scalloped Potato, Broccoli Parmesan and Grilled Tomato 20. Baked Atlantic Salmon served with Lemon Dill Sauce, Garlic Mash Yukon Gold Potatoes, Carrots in Ginger, Sautéed Spinach Leafs and Artichoke Salad 21. Broiled Petit Filet Mignon with Fricassee of Exotic Mushrooms and Sautéed Shrimp served with Black Olive Risotto, Stewed Zucchini and Grilled Asparagus View Results 116

Weekly Duet Meal Menu for the Week of March 15-21

| | Number of Duet Meals | Delivery Time: |
|---|---|---|
| Monday March 15 $<br>Half Chicken BBQ New Orleans Style, Skinless and Partially Boned, Cajun Sauce, Jambalaya Rice, Stewed Tomato Braised Onions, Grilled Zucchini | ☐ 113 | 4:30 5:00 5:30 6:00 6:30 7:00 7:30 8:00 8:30 114 |
| Tuesday March 16 $<br>Baked Three White Meat Loaf, Turkey, Chicken and Veal with a Mushroom Sauce, Macaroni au-Gratin, Braised Escarole, Buttered Baby Corn | ☐ | 4:30 5:00 5:30 6:00 6:30 7:00 7:30 8:00 8:30 |
| Wednesday March 17 $$<br>6. Alaska Filet of Halibut Meuniere, Lemon Butter Sauce, With Caramelized Onions, Julienne of Sautéed Three Peppers, Green Asparagus | ☐ | 4:30 5:00 5:30 6:00 6:30 7:00 7:30 8:00 8:30 |
| Thursday March 18 $<br>Half Chicken BBQ New Orleans Style, Skinless and Partially Boned, Cajun Sauce, Jambalaya Rice, Stewed Tomato Braised Onions, Grilled Zucchini | ☐ | 4:30 5:00 5:30 6:00 6:30 7:00 7:30 8:00 8:30 |
| Friday March 19 $$$<br>Southwestern Crab Cake, Blended Crabmeat with Zesty Herbs and Spices, served with Braised Endive, a Puree of Sweet Potato and Carrots | ☐ | 4:30 5:00 5:30 6:00 6:30 7:00 7:30 8:00 8:30 |
| Saturday March 20 $$$$<br>Broiled Petit Filet Mignon with Fricassee of Exotic Mushrooms and Sautéed Shrimp served with Black Olive Risotto, Stewed Zucchini and Asparagus | ☐ | 4:30 5:00 5:30 6:00 6:30 7:00 7:30 8:00 8:30 |
| Sunday March 21 $$<br>Braised Fresh Leg of Pork Polonaise Style with Sweet and Sour White and Red Cabbage, Candied Yams, Creamed Corn and Potato Pancake | ☐ | 4:30 5:00 5:30 6:00 6:30 7:00 7:30 8:00 8:30 |

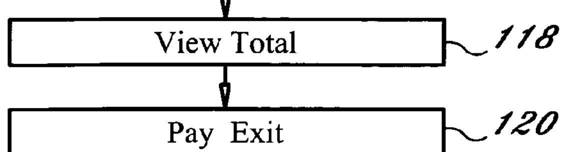

FIG. 15

Guest Chef Program 140

Name of Guest Chef: John Smith
Guest Chef Experience/History
Smith was called "the emperor of chefs" and "emperor of the world's kitchens" by Emperor William II of Germany. He modernized and codified the elaborate haute cuisine by Marie-Antoine Careme and developed the 'brigade de cuisine' system of kitchen organization. Smith was chef at the Carlton Hotel in London, the Grande National Hotel in Monte Carlo and the Savoy in Paris. His books include "Guide Culinaire" and "Ma Cuisine"

Date of Planned Special Duet Dinner: Thursday April 1st $$$$$
Two Prime Petit Filet Mignon Pan Fried
Topped with Foie Gras and a Truffled Sauce
and 141
Two Half East Coast Lobster Tail with
Jumbo Lump Crab Meat Thermidor Style
Scalloped potato Boulangere
Green Asparagus with Red Pepper Sauce
Half Tomato Stuffed with a Puree of
Zucchini and Basil Braised Celery Heart Click on it to vote and make it your favorite choice $$$$
Roasted NY Sirloin au Jus and Grilled Jumbo Shrimps
Red Skin Potato Rissole
French Green Beans and Roasted Almonds
Scalloped Potato Boulangere 142
Steamed Glazed White Asparagus
Braised Belgian Endives Click on it to vote and make it your favorite choice $$$
Broiled Chicken Breast and Sautéed Jumbo Shrimps
Served with a Rice Pilaf
Buttered Green Beans Baby Corn 143
Scalloped Potato Boulangere
Stewed Tomato with Basil Click on it to vote and make it your favorite choice

FIG. 16

APPARATUS AND METHOD FOR DELIVERING FRESHLY-PREPARED FINE FOOD

CROSS-REFERENCE TO RELATED APPLICATIONS

This application claims the benefit of U.S. Provisional Patent Application No. 60/544,643, filed Feb. 13, 2004, pending, the disclosure of which application is incorporated by reference as if fully set forth herein A portion of the disclosure of this patent document contains material which is subject to copyright protection. The copyright owner has no objection to the facsimile reproduction by anyone of the patent document or the patent disclosure as it appears in the Patent and Trademark Office patent files or records, but otherwise reserves all copyrights whatsoever.

STATEMENT REGARDING FEDERALLY SPONSORED RESEARCH OR DEVELOPMENT

Not Applicable

BACKGROUND OF THE INVENTION

The present invention relates generally to a foodservice system and method utilizing a food carrier for the delivery of high quality meals that are hot (or cold) and safe to eat with a fresh appearance. More particularly, this invention concerns an apparatus and method for packaging and delivering freshly-prepared, fine hot food.

The background art is characterized by U.S. Pat. Nos. 1,683,889; 2,543,524; 2,591,151; 2,883,835; 3,130,288; 3,353,886; 3,410,109; 3,516,218; 3,536,132; 3,633,381; 3,805,018; 3,952,794; 4,182,405; 4,570,800; 4,904,848; 5,052,369; 5,082,115; 5,111,664; 5,297,616; 5,485,921; 5,497,883; 5,598,713; 5,711,164; the disclosures of which patents are incorporated by reference as if fully set forth herein.

Background art food carriers are not designed for the specific uses envisioned by the applicant. Most involve complicated arrangement of several parts which makes them impractical to use, expensive and difficult to manufacture and maintain.

There is a need to satisfy customers who do not want to leave their homes to have dinner in a restaurant. A special container is needed for delivering to where the customer wants to be, at home, enjoying fine food without having to do anything to it. There is also a need for a convenient service to cater at home and renew a traditional American way of entertaining. There is also a need for fine food that is safe to eat with a guaranteed temperature above 140 degrees.

BRIEF SUMMARY OF THE INVENTION

The purpose of the invention is to maintain freshly-prepared fine food, hot (above 140 degrees) or cold (below 40 degrees) with a fresh appearance and safe to eat for a period of two hours or more. This invention finds utility in improving the lifestyle of busy consumers by delivering the finest meals, right to where they want to be (at home). The meals are tasty and safe to eat, have a fresh appearance, and are affordable and completely table ready.

The CaterBox™ is a preferred element for a new category in the food industry upon which a strategic, profitable business can be designed that will rewrite some of the rules of the industry from the ground up. It will offer sustainable competitive advantages. The food carrier, combined with a business method implemented on the Internet, eliminates the guessing that is the cause for the high rate of failure in the food industry. Instead, guessing will be replaced by knowing what the consumer wants, how much and when, down to the minute, enabling the company to earn competitive profits for an unusually long time.

One object of preferred embodiments of the invention is to maintain food temperature two hours or more. Another object of preferred embodiments of the invention is to store vegetables in such a way that they are still green after being kept hot (or cold) for two hours. Yet another object of preferred embodiments of the invention is to provide consumers with a high level of convenience in obtaining fine food that is hot (or cold), safe to eat and completely table-ready. Another object of preferred embodiments of the invention is to provide a convenient-to-use, reusable, practical, cost-effective commercial food carrier. Another object of preferred embodiments of the invention is to provide a food carrier that has a single-piece body made of a non-toxic, insulating material having a single chamber that opens from the side and that incorporates a non-disposable, heat-retaining, stylish, versatile casserole dish.

Yet another object of preferred embodiments of the invention is to maintain the appearance of hot (or cold) foods, especially green vegetables, for a period of two hours. Another object of preferred embodiments of the invention is to facilitate delivery of a variety of fine foods, including breakfast, brunch, lunch, dinner, appetizers, and hors d'oeuvres. Another object of preferred embodiments of the invention is to facilitate delivery of a wide variety of food preparations including, broiled, steamed, poached, sauteed, fricasseed, grilled, BBQ, stewed, braised, and roasted. Another object of preferred embodiments of the invention is to allow the use of different serving styles including buffet, butler and family style. A further object of preferred embodiments of the invention is allowing a delivery period of two hours which allows for delivering a guaranteed product that is safe to eat because it has been maintained at a safe temperature: preferably above 140 degrees F. for hot foods and below 40 degrees F. for cold foods. Another object of preferred embodiments of the invention is to prevent contamination with a sealed chamber, allowing for delivery of a safe-to-eat product. Another object of preferred embodiments of the invention is to provide a carrier that is stackable with interlocking lugs and cavities to secure them during transport. Another object of preferred embodiments of the invention is to provide a system including a tongue on the frame door of the body and groove located on the door. A further object of preferred embodiments of the invention is a system that allows the operator to maintain complete control of a carrier at all times, knowing when and where it is delivered and picked up for return. Another object of preferred embodiments of the invention is to provide a tracking system consisting of a bar code or other identification means. Another object of preferred embodiments of the invention is to provide means for absorbing the condensation in the chamber so that the food that is not soggy upon delivery. Another object of preferred embodiments of the invention is to provide a one-hand held design that increases functionality, leaving one hand free for opening a door.

In a preferred embodiment, the invention is a practical and well-organized system and method for packaging and delivering, with the utmost convenience, freshly prepared fine meals that are hot (or cold), safe to eat and completely table ready. Preferably, the system comprises a reusable food carrier that comprises an insulated container and a casserole dish. Preferably, the insulated container is made of a non-toxic, insulating material that sustains heat on contact up to 350 degrees F. (Fahrenheit). Furthermore, in a preferred embodiment, the material of the carrier is molded into a single body with self-skinning, hard shell that is suitable for heavy usage. Preferably, the casserole dish is made of a commercial, premium-quality, heat-retaining material that sustains heat in the range of 400 degrees F. The casserole dish preferably offers flexibility in the number of meals it can hold, and the kind of food that can be served in it, and yet is stylish enough to be used on any dining table.

In a preferred embodiment, the invention is a food carrier comprising: a body having an interior, an exterior and an opening, said exterior defining a top surface and a bottom surface and said interior defining a compartment having a floor; a door for covering said opening, said door having an open position, a closed position, an inside surface that is configured to seal against said body when said door is in the closed position and a partial vacuum is created within said compartment and an outside surface; sealing means (e.g., a tongue and groove system) disposed around said opening; a passageway connecting said interior and said exterior; a valve (e.g., an on-off valve) on said passageway; means (e.g., a vacuum pump) for creating said partial vacuum in said compartment by evacuating air from said compartment through said passageway and said valve; and means (e.g., a gas mixer) for introducing a gas through said passageway and said valve and into said compartment to replace a portion of said evacuated air. Preferably, said body and said door are insulated and said inside surface is level with said floor when the bottom surface of said body and the outside surface of said door rest on a flat surface and said door is in said open position. Preferably, the food carrier further comprises: a rack (e.g., a wire rack) that is configured to attach to the floor of said compartment; and a dish (e.g., a casserole dish with a cover) that is configured to fit within said compartment and rest on said rack. Preferably, the food carrier further comprises: a condensation absorbing system that rests on said rack. Preferably, the food carrier further comprises: a handle (e.g., a foldable handle) for use in carrying said carrier, said handle being attached to said top surface (and, preferably, to a cavity in said top surface). Preferably, the food carrier further comprises: a hinge that connects said door to said body; and a closing fastener that is capable of locking said door in said closed position. Preferably, said body is fabricated using a non-toxic polyimide foam and said dish is a casserole dish.

In another preferred embodiment, the invention is a method for delivering food comprising: inserting a dish containing a food in a food carrier disclosed herein; closing the door of the carrier; creating a partial vacuum in said compartment; introducing a gas into the compartment to replace a portion of the evacuated air; transporting said food carrier to an eating location; opening the valve on said carrier to eliminate the partial vacuum in the compartment; opening the door of the carrier; and removing the dish. Preferably, the method further comprises: replacing the dish in the carrier; reclosing and locking the door; retrieving the carrier; removing and cleaning the dish; removing and cleaning the rack; and cleaning the carrier.

In yet another preferred embodiment, the invention is a method for preserving the fresh appearance of food comprising: heating a food; placing the hot food in an insulated container; creating a partial vacuum in said container by removing air from said container; and introducing a gas into said container to replace a portion of said removed air. Preferably, sufficient air is removed from the container in the creating step to reduce the pressure in the container by about five pounds per square inch and the gas comprises a mixture selected from the group consisting of: a 100 percent nitrogen gas and a 70 percent nitrogen/30 percent argon gas.

In a further preferred embodiment, the invention is a method for operating a food preparation and delivery service, said method comprising: inviting a plurality of households within a zone to register for the service by mailing a password to each selected household within said zone; accepting a first input from a particular selected household via a website, said first input comprising the password, a name and address for said particular selected household, a rating of the favorite foods of said particular selected household and an agreement that said particular selected household will comply with a plurality of rules of the service, and storing said first input; at the request of said particular selected household, displaying a menu for each day in a current time period via a website, each said menu being capable of serving about two people; at the request of said particular selected household, displaying a dish for each day in a first future time period via a website, accepting a first order from said particular selected household for delivery of one or more portions of said dish at a desired time and a payment for said first order, and storing said first order; at the request of said particular selected household, displaying a list of possible menus for a second future time period, accepting a second input from said particular selected household of a vote identifying the favored dishes of said particular selected household on said list and storing said second input; and at the request of said particular selected household, displaying a description of a plurality of guest chef signature specials, accepting a third input from said particular selected household of a favorite signature special and storing said third input. Preferably, the method further comprises: at the request of any household, displaying a plurality of catering-to-go choices, accepting a fourth input of a selected choice of said any household and storing said fourth input. Preferably, the method further comprises: delivering said dish to said particular selected household in a food carrier disclosed herein. Preferably, the method further comprises: delivering said dish to said particular selected household in accordance with a delivery method disclosed herein.

In another preferred embodiment, the invention is a method for operating a food preparation and delivery service, said method comprising: a step for inviting a plurality of households within a zone to register for the service by providing a password to each selected household within said zone; a step for accepting a first input from a particular selected household via a website, said first input comprising the password, a name and address for said particular selected household, an agreement that said particular selected household will comply with a plurality of rules of the service, and storing said first input; a step for, at the request of said particular selected household, displaying a dish for each day in a first future time period via a website, accepting a first order from said particular selected household for delivery of one or more portions of said dish at a desired time and a payment for said first order, and storing said first order; a step for, at the request of said particular selected household, displaying a list of possible menus for a second future time period via a website, accepting a second input from said particular selected household of a vote identifying the favored dishes of said particular selected household on said list and storing said second input; and a step for delivering said dish to said particular selected household in a food carrier disclosed herein.

In another preferred embodiment, the invention is a method for operating a food preparation and delivery service, said method comprising: means for allowing a plurality of households within a zone to register for the service by providing a password to each selected household within said zone; means for accepting a first input from a particular selected household via a website, said first input comprising the password, a name and address for said particular selected household, an agreement that said particular selected household will comply with a plurality of rules of the service, and storing said first input; means for, at the request of said particular selected household, displaying a dish for each day in a first future time period via a website, accepting a first order from said particular selected household for delivery of one or more portions of said dish at a desired time and a payment for said first order, and storing said first order; means for, at the request of said particular selected household, displaying a list of possible menus for a second future time period via a website, accepting a second input from said particular selected household of a vote identifying the favored dishes of said particular selected household on said list and storing said second input; and means for delivering said dish to said particular selected household in accordance with a delivery method disclosed therein.

In a further embodiment, the invention is a method for operating a food preparation and delivery service, said method comprising: inviting a plurality of households within a zone to register for the service by providing a password to each selected household within said zone; accepting a first input from a particular selected household via a website, said first input comprising the password, a name and address for said particular selected household an agreement that said particular selected household will comply with a plurality of rules of the service, and storing said first input; at the request of said particular selected household, displaying a dish for each day in a first future time period via a website, accepting a first order from said particular selected household for delivery of one or more portions of said dish at a desired time and a payment for said first order, and storing said first order; and at the request of said particular selected household, displaying a list of possible menus for a second future time period via a website, accepting a second input from said particular selected household of a vote identifying the favored dishes of said particular selected household on said list and storing said second input.

In yet another preferred embodiment, the invention is a method for operating a food preparation and delivery service, said method comprising: inviting a plurality of households within a zone to register for the service; at the request of said particular selected household, displaying a dish via a website for each day in a first future time period, accepting an order as a first input from said particular selected household for delivery of one or more portions of said dish at a desired time and a payment for said first order, and storing said first input; and at the request of said particular selected household, displaying a list of possible menus via a website for a second future time period, accepting a second input from said particular selected household of a vote identifying the favored dishes of said particular selected household on said list and storing said second input.

In another preferred embodiment, the invention is a food carrier comprising: a body having an interior, an exterior and an opening, said exterior defining a top surface and a bottom surface and said interior defining a compartment having a floor; a door for covering said opening, said door having an open position, a closed position, an outside surface, and an inside surface that is configured to produce a seal when said door is in the closed position; a tongue and groove system for establishing said seal between said body and said door when said door is in the closed position; a passageway connecting said interior and said exterior and a valve on said passageway; a rack that is configured to attach to the floor of said compartment; a dish that is configured to fit within said compartment and rest on said rack; and a condensate absorbing system that rests on said rack. Preferably, the food carrier further comprises: a vacuum pump for creating said partial vacuum in said compartment by evacuating air from said compartment through said passageway and said valve; and a plurality of gas sources and a gas mixer for introducing a gaseous mixture through said passageway and said valve and into said compartment to replace a portion of said evacuated air.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings:

FIG. 6 is a perspective view of the handle of a preferred embodiment of the invention, with the handle in the up position.

FIG. 7 is cross sectional view of the body and closed door of the food carrier in accordance with a preferred embodiment of the invention, showing the tongue and groove.

FIG. 8 is a cross sectional view of the door of the food carrier in accordance with a preferred embodiment of the invention.

FIG. 12 is a schematic flow diagram of a portion of the Duet™ meal process of a preferred embodiment of the invention.

FIG. 14B is the first part of a schematic flow diagram of another portion of the Duet™ meal process of a preferred embodiment of the invention.

FIG. 15 is a preferred embodiment of a display of the final menu with the seven Duets (one for each day of the week) ready for orders to be placed.

FIG. 16 is a schematic flow diagram of the Guest Chef Program of a preferred embodiment of the invention.

Figure 1:
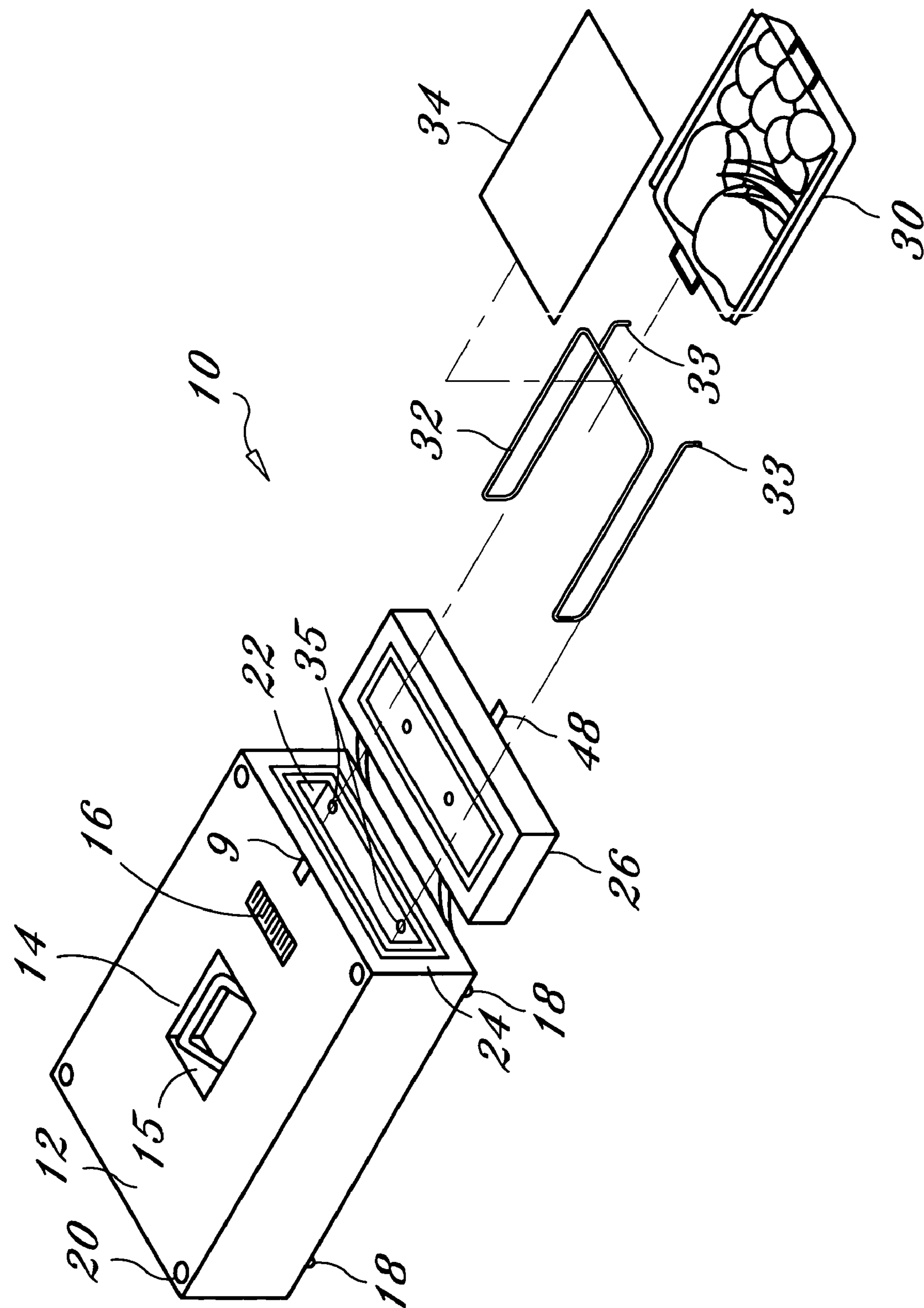
FIG. 1 is an exploded view of the food carrier in accordance with a preferred embodiment of the invention.
Figure 2:
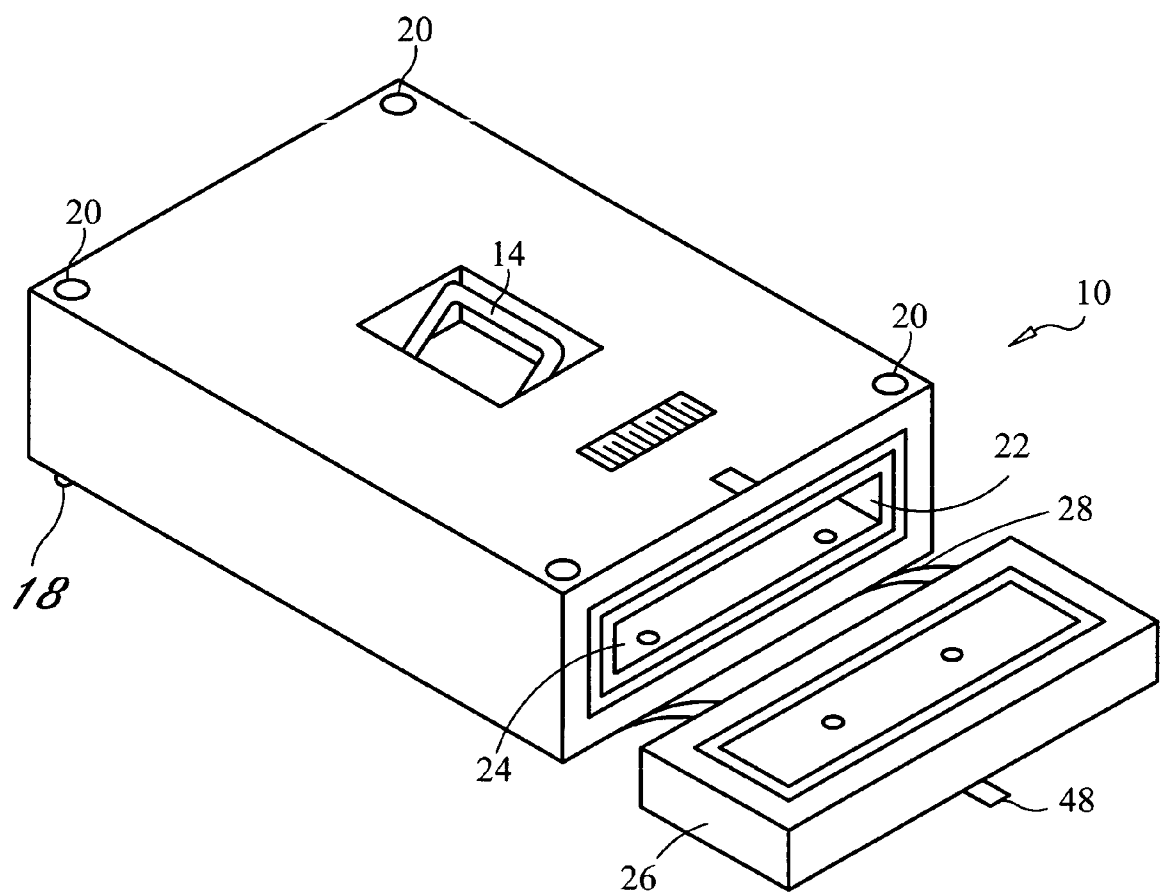
FIG. 2 is a perspective view of the body and door of the food carrier in accordance with a preferred embodiment of the invention.
Figure 3:
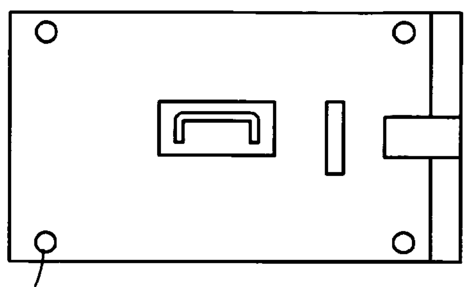
FIG. 3 is a plan view of the top of the body and door of the food carrier in accordance with a preferred embodiment of the invention.
Figure 4:
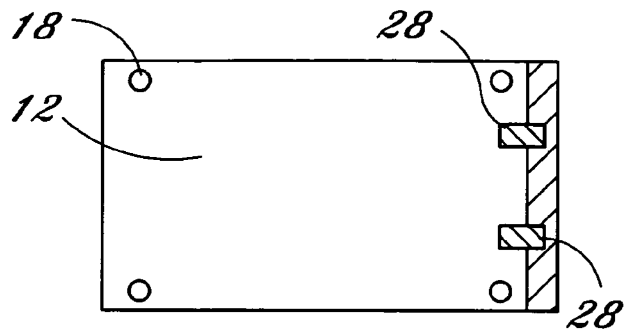
FIG. 4 is a plan view of the bottom of the body and door of the food carrier in accordance with a preferred embodiment of the invention.

The following reference numerals are used to indicate the parts and environment of the invention on the drawings:

9 lock
10 food carrier, carrier
12 hollow body, body
14 handle
15 recess
16 bar code
18 lugs
20 cavities
22 opening
24 chamber
26 door
28 hinge
30 casserole dish, dish
32 wire rack
33 pins
34 absorbent material, condensation absorbing material
35 holes
36 customized atmosphere, gas mixture
38 valve
42 tongue
44 groove
46 release button
48 latch
50 gas mixer
52 insert dish step
54 close door step
56 create vacuum step
58 introduce gas step
60 deliver carrier step
62 open valve step
64 open door step
66 remove dish step
68 replace dish step
70 reclose door step
72 retrieve carrier step
74 clean dish step
76 clean rack step
78 clean carrier step
80 system
82 server
84 database
86 mobile computing device
88 personal computer
89 network
90 business method, service
100 display home page step
101 initiate registration step
102 enter address step
103 enter rating
104 display rules
105 indicate agreement
110 access Duet™ meal menus step
111 view current menus step
112 Duet™ meal ordering step
113 indicate number step
114 indicate time step
115 voting step
116 view results step
118 display total step
130 catering-to-go step
131 make catering choices step
132 enter delivery address step
133 view shopping cart step
134 view total charges step
135 catering rules and regulations
136 agree to rules step
137 pay step
140 order guest chef special step
141 first signature dish
142 second signature dish
143 third signature dish
150 favorite meat and fish at registration
152 favorite Duet for the week
154 favorite guest chef signature dish
156 favorite holiday Duet
158 favorite brunch spare
160 favorite spare B
162 favorite spare C
164 favorite spare D
165 popular catering-to-go choice
170 favorites data storage

DETAILED DESCRIPTION OF THE INVENTION

Referring to FIGS. 1-8, a preferred embodiment of food carrier 10 is illustrated. Preferably, food carrier 10 comprises an insulated container consisting of single-piece, molded, hollow body 12 made of high-density hard shell, non-toxic insulating foam that is resistant on contact to high heat up to 350 degrees F., can sustain heavy duty usage and commercial machine washing, and maintain temperature of hot food safely above 140 degrees F. and cold food under 40 degrees F. for a period of two hours (or longer).

Preferably, a non-toxic insulating material is used to fabricate body 12 as a single piece. Blow molding and self-skinning is the preferred method of fabrication so as to avoid any joints that would not withstand commercial washing used for sanitizing of chamber 24 after each usage. The material also must be durable so it resists heavy commercial usage. In a preferred embodiment, body 12 is made of TEEK, an innovative polyimide, non-toxic foam developed by the National Aeronautics and Space Administration (NASA) Langley Research Center and licensed to SORDAL Inc. The material is manufactured under the registered name of SOLREX® in Holland, Mich. A person skilled in the art would understand that other materials and processes could be used to fabricate portions or all of body 12, e.g., urethane could be used.

Preferably, food carrier 10 is lightweight and specifically designed to be practical to use for both the catering system operator and the consumer. In a preferred embodiment, food carrier 10 is rectangular in shape with single handle 14 mounted on the top of body 12 for holding food carrier 10 in a horizontal position. Preferably, handle 14 is recessed in recess 15.

For inventory and tracking control, each carrier 10 is preferably identified with its own bar code 16 embedded in body 12. During transport in the delivery mode, the carriers are stacked and held secure by lugs 18 on the top of body 12 and cavities 20 on the bottom of body 12. At one end of hollow body 12, opening 22 provides access to chamber 24 inside hollow body 12. Opening 22 is normally covered by door 26 that is connected to hollow body 12 by hinge 28 so that door 26 can lay down flat when open.

Pre-heated casserole dish 30, which is used to hold the freshly-prepared fine food, is placed inside chamber 24 on wire rack 32. Preferably, casserole dish 30 rests on a bottom portion of wire rack 32 which also comprises a top portion that holds absorbent material 34. The bottom portion of wire rack preferably has downwardly-projecting two pins 33. Pins 35 are received by two holes 35 in the floor of chamber 24. In use, absorbent material absorbs the condensation from the hot food in chamber 24. Preferably, absorbent material 34 comprises a Condensation Absorbing System (CAS). Preferably, absorbing material 34 is made of 34 pound, airlaid, non-woven, Food and Drug Administration (FDA) approved, bicomponent fibers, manufactured by Atlantic Mills Inc. of Lakewood, N.J. A person skilled in the art would understand that other materials and processes could be used to fabricate portions or all of absorbent material 34 or to achieve condensate absorption.

For fine foods whose appearance must be preserved, customized atmosphere 36 comprising a mixture of gases is introduced into chamber through valve 38 placed mounted on door 26. The location of door 26 serves two purposes: (1) the side opening offering better insulation in the ceiling, and when the door is open less heat escapes compared to a top opening, and (2) when door 26 is open, it lays down flat so that still-hot casserole dish 30 can be easily slid in or out of chamber 24. Door 26, when closed and locked by means of lock 9 is kept sealed to body 12, allowing for zero contamination during transport. Preferably, gaskets are preferably not used to seal door 26 to body 12 because they would not withstand heavy-duty commercial washing. Instead, a system of tongue 42 and groove 44 is formed as part of the molding process, with tongue 42 preferably located on the door frame of body 12 and groove 44 preferably located on door 26, so that when door 26 is secured in a closed position with latch 48, food carrier 10 is airtight.

Casserole dish 30 is an important component of preferred embodiments of the invention, and is preferably unbreakable and heat retaining. In a currently preferred embodiment, casserole dish 30 is a three-quart, glass dish, Model W1000/176 manufactured by Anchor Hocking of Lancaster, Ohio. A person skilled in the art would understand that other materials and processes could be used to fabricate portions or all of casserole dish 30. Using a versatile casserole dish offers a variety of ways to serve food limited only by imagination. It has the unique advantage of fitting on any dining table without having to transfer the food because it has class all by itself. It offers unlimited flexibility in the kind and the amount of food it can hold; hot or cold, from organic to kosher, even nutracuetical. It is ideal for serving two dinner main courses (meat or fish), complete with vegetables and starch, prepared in any style, Chinese, Italian, even classic French. The same casserole dish can also be used for home-style catering, up to ten portions of stewed meat or lasagna or shrimp scampi and have the vegetables and starch served in another casserole in another carrier. It is ideal for cocktail parties, hors d'oeuvres and desserts, and it offers three serving styles, buffet, butler or family style. For catering, a cover (not shown) is preferably placed on dish 30 to avoid spills.

In use, casserole dish 30 is preferably pre-heated to 325 degrees F. before the hot food is placed in it. This operation is preferably performed quickly, so a maximum of heat energy is captured in chamber 24.

Figure 5:
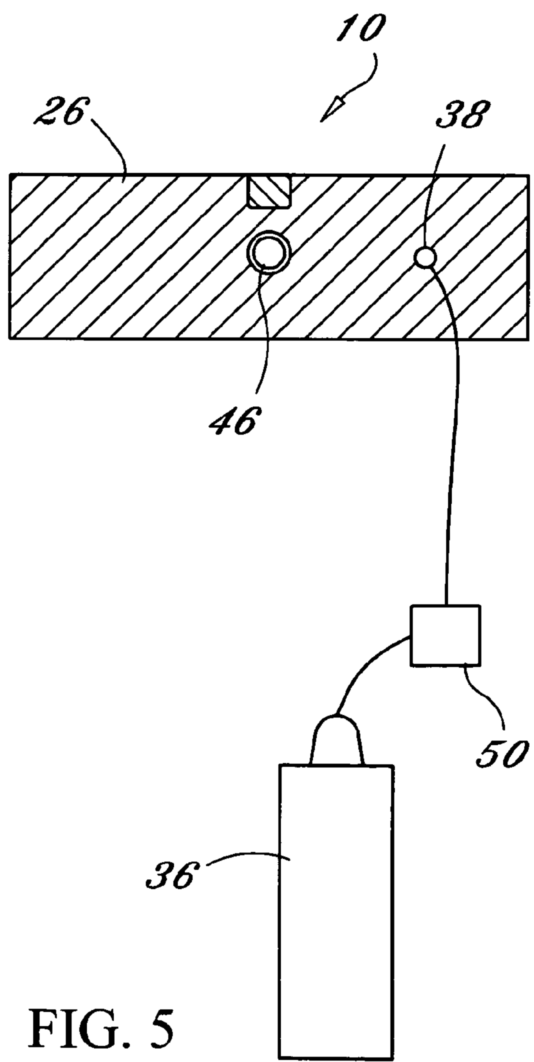
FIG. 5 is elevation view of the door of the food carrier in accordance with a preferred embodiment of the invention.
Figure 9:
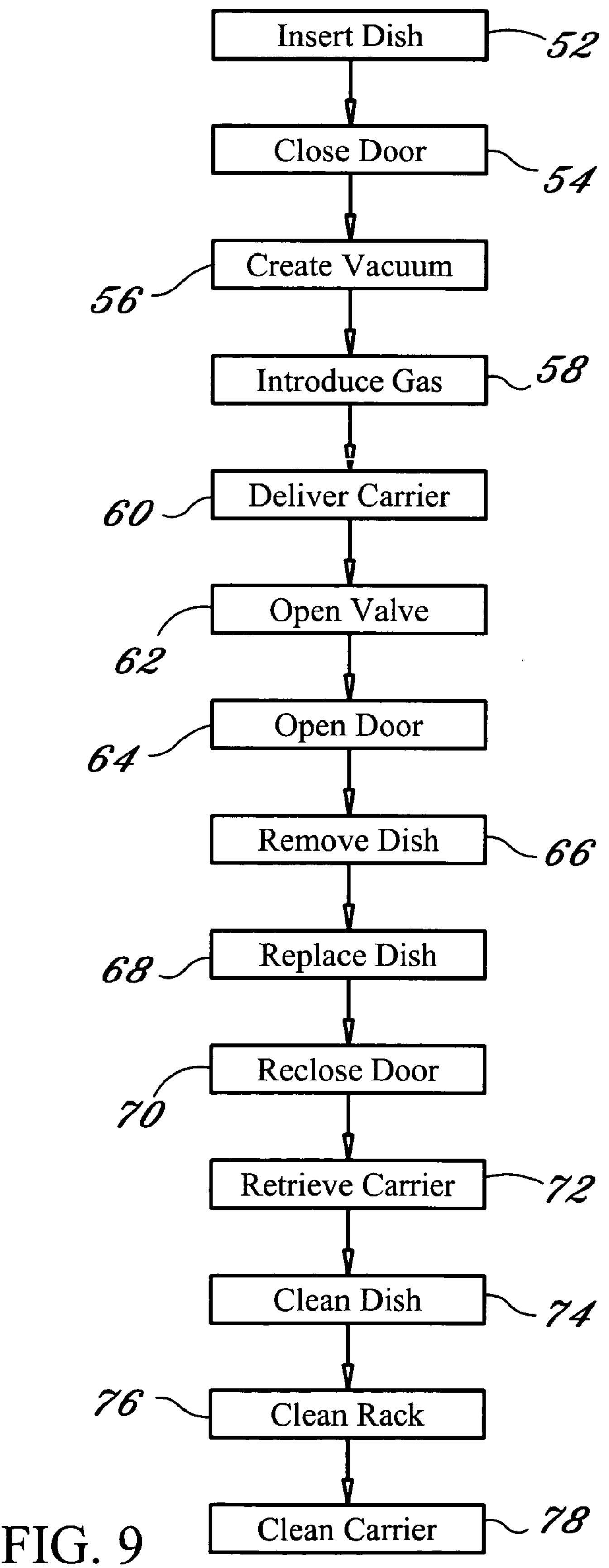
FIG. 9 is a schematic flow diagram of the food delivery process of a preferred embodiment of the invention.

Referring to FIG. 9, preparation and packaging of the food is preferably accomplished in a specially-designed commercial kitchen centrally located near to the targeted delivery market, on a mass production line. While still hot, the freshly prepared food is placed in casserole dish 30 that has been pre-heated to 325 degrees F. Casserole dish 30 is slid into the chamber 24 of carrier 10 along with wire rack 32 and condensation absorbing material 34 in insert dish step 52 and then door 26 is quickly closed in close door step 54. As is illustrated in FIG. 5, after door 26 is closed, a connector is placed on valve 38, at least a portion of the air/oxygen in chamber 24 is removed in create vacuum step 56 and special custom gas mixture 36 is introduced into chamber 24 using gas mixer 50 in introduce gas step 58. Preferably, this operation is performed using the MAP Mix 9000 gas mixer manufactured by TOPAC of Hingham, Mass. The MAP Mix 9000 gas mixer is a proportional gas mixer for air, argon, carbon dioxide, nitrogen, oxygen, and similar gases. The gases are combined in a chamber fed by variable orifices, which are set by the mixing control on the front panel. The MAP Mix 9000 is a pneumatic device, which works by balancing pressures from the input gas supplies to ensure that the component gases are mixed at the same pressure regardless of their individual inlet pressures and flow rate. A person skilled in the art would understand that other products or techniques could be used for gas mixing.

In a preferred embodiment, valve 38 on door 26 to a vacuum pump (not shown) and the pressure inside chamber 25 is reduced by about five pounds per square inch (psi). Then valve 38 is closed, connected to gas mixer 50 and the pressure inside chamber 24 is preferably increased by about 4 psi. using a selected gas mixture 36. Applicant has found that different mixtures of gases (100 percent nitrogen, 70 percent nitrogen/30 percent argon, etc.) are required for different green vegetables. For example, only green asparagus reacts the same with argon and nitrogen. Green beans turn an ugly brown with nitrogen only. Green beans sautéd in butter require a different mixture than green beans boiled in water. Thus, each vegetable requires its own custom gas mixture according to type and preparation. A person having ordinary skill in the art would understand how an acceptable gas mixture can be determined for each dish by experimenting with mixtures of inert gases (e.g., nitrogen, argon, etc.) and oxygen or air.

After they are ready for delivery, the food carriers are stacked in a commercial van. In step 60, delivery preferably occurs within a driving-radius of one hour from the production kitchen. To open door 26, the customer pushes release button 46 in open valve step 62 to allow ambient air to enter chamber 24, unlocks and opens door 26 in open door step 64 and retrieves casserole dish 30 by sliding it onto door 26 in remove dish step 66. Each food carrier 10 is preferably embossed or otherwise marked with bar code 16 that is used by the operator to identify where and when it was delivered and, where and when it will be picked up for return.

For cold food, the casserole dish is pre-cooled to a low temperature of about 32 degrees F. before the cold food at (at about 34 degrees F.) is placed in it. In a preferred embodiment, the food will stay cold for two hours and longer.

Referring again to FIG. 9, when the customer has finished with the meal, the empty casserole dish is placed in chamber 24, as is, with no washing by the customer being necessary, in replace dish step 68. Door 26 is closed and locked by means of lock 48 in reclose door step 70 and carrier 10 is ready to either be returned or exchanged for another carrier 10 containing the next meal in retrieve carrier step 72. When returned to the production kitchen, casserole dish 30 is removed to be machine washed and sanitized in clean dish step 74. Wire rack 32 is removed to allow disposal of spent absorbing material 34 in clean rack step 76, chamber 24 is machine washed and sanitized in clean carrier step 78.

Figure 10:
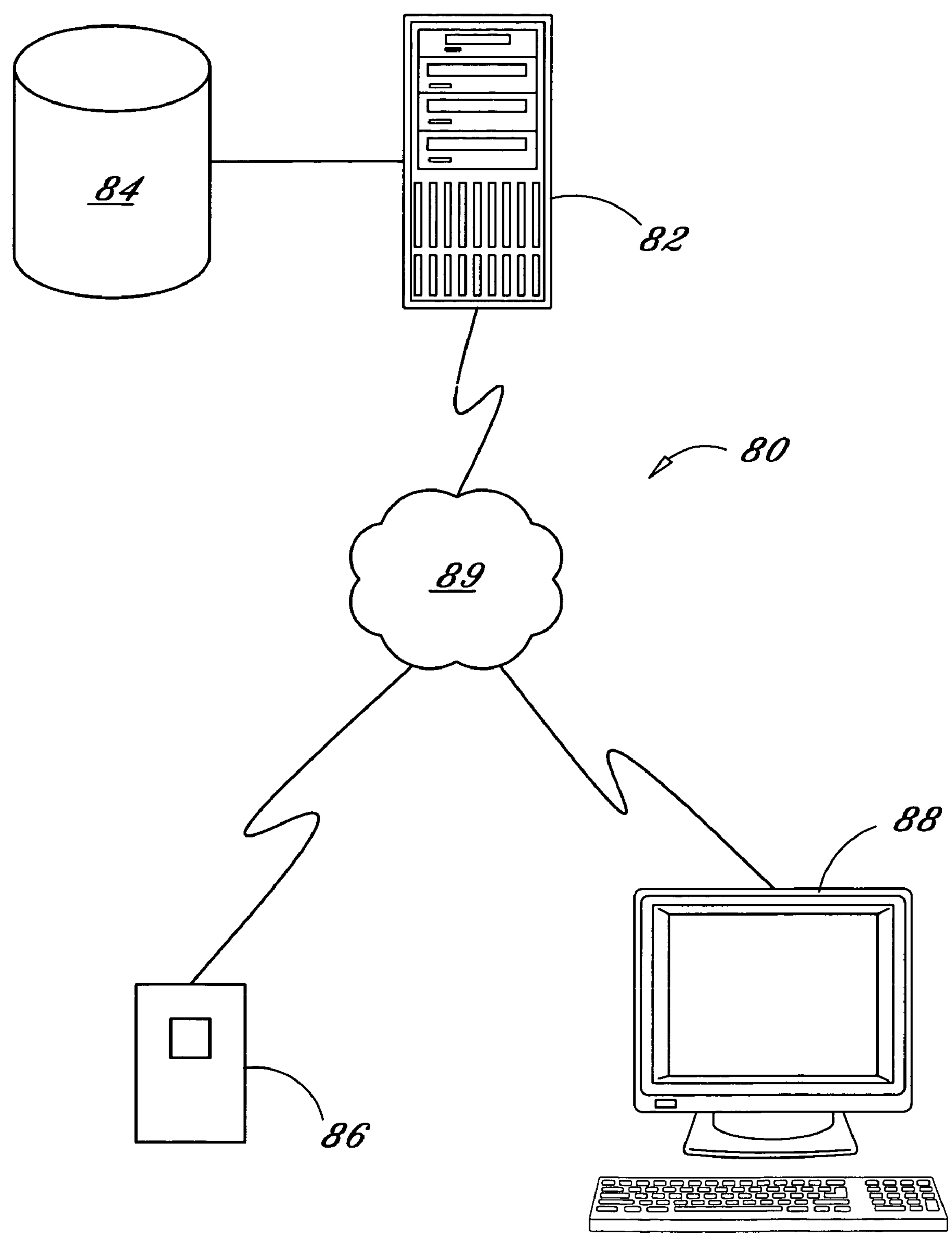
FIG. 10 is a schematic block diagram of a preferred embodiment of the invention.

In another preferred embodiment, the invention is system 80 and method 90 for collecting data information on favorite prepared foods from pre-registered (e.g., particular, selected) households in predetermined communities and utilizing the data to purchase, prepare and deliver, with the utmost convenience (preferably utilizing food carrier 10), ready-to-eat dishes at the most affordable prices. Referring to FIG. 10, a preferred embodiment of system 80 is presented. System 80 preferably comprises server 82 which is connected to database 84, and mobile computing device 86 and/or personal computer 88 which are connected to server 82 via Internet or network 89. A variety of data are stored in database 84, mobile computing device 86 and/or personal computer 88. These data have any appropriate form (e.g., relational database tables or records, object database objects, extensible markup language files, etc.), but preferably contain the data structures disclosed herein.

Preferably, each production kitchen is located in an industrial zone warehouse type building so as to provide the most efficient in-time delivery to the customer base of the service. A one-hour drive is preferably the maximum distance allowed for a delivery. In a preferred embodiment, a delivery zone consists of all the communities to be served from a particular centrally-located production kitchen. Communities are preferably divided into blocks. A block is a grouping of registered households (RH) preferably located together to which a carrier can be delivered in a single window. Blocks are preferably numbered for easy identification. A window is a time frame (preferably a half an hour) in which meals can be delivered to most households in the same block. Once a household is registered, it is identified by the name of the household, street name and number and its block number. A delivery address preferably comprises the community name, block umber, number of the house, the street name and the window. A registered household (RH) is one that has completed the required registration step and answered all the questions pertinent to the people who live in the house, indicating their favorite foods and assuring that all rules and regulations are understood and agreed to. A comestible delivery vehicle (CDV) operated by a comestible delivery technician (CDT) is preferably used to affect the deliveries. CaterBox™ food carrier is the preferred name of the food carrier. Duet™ meal is the preferred name of a product comprising two main-course dinners served in a CaterBox™ food carrier.

The initial contact with a chosen community is preferably by U.S. mail announcing the start-up (or availability) of service 90. Invitations are mailed to households within a block with appropriate addresses with name of occupant are garnered from a purchased mailing list. The mailing is made on a block per block basis to introduces the new service and provide a unique password to each household. A preferred worldwide web (WWW) domain for the home web page of the service is finefoodtogo.com.

Figure 11:
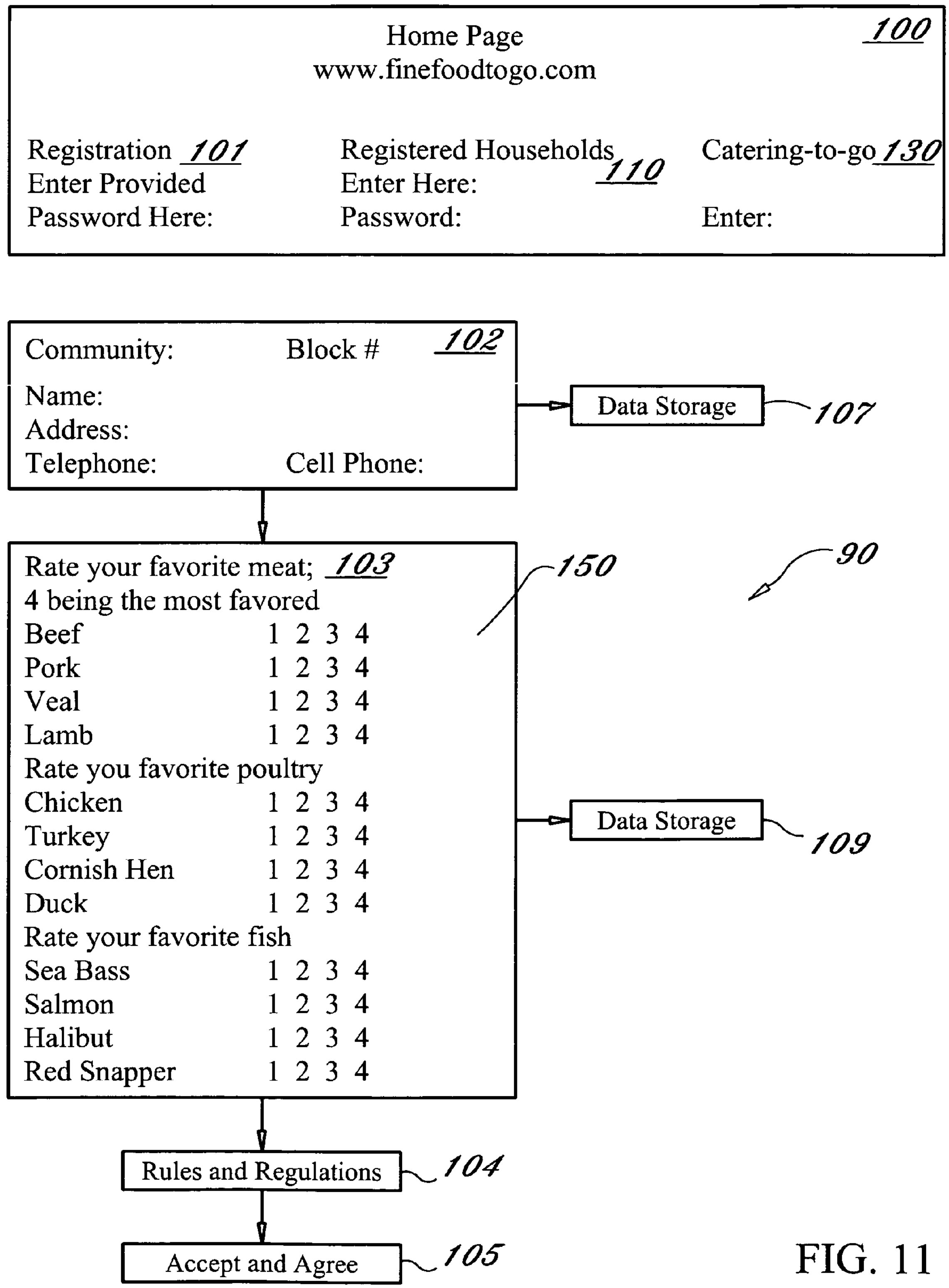
FIG. 11 is a schematic flow diagram of the registration process of a preferred embodiment of the invention.

Referring to FIG. 11, a schematic flow diagram of the registration process of a preferred embodiment of business method 90 is presented. The home page of the business transmitted from server 82 is presented on mobile computing device 86 or personal computer 88 in display home page step 100. The home page is preferably divided in three different sections: registration section, where only invited households have access by using the provided password to register; registered households section, where pre-registered households have access by password; and catering-to-go section which is available to anyone.

In a preferred embodiment, registration is required only at the time of ordering, but may occur before ordering. To register, an invited household uses the password provided in the mailing described above to access the registration page(s) in initiate registration step 101. The address is entered in enter address step 102, preferably leaving no required entry blank. Address data are stored in database 84 in store address step 107. In enter rating step 103, the rating of the favorite meat, poultry and fish for the household is entered. When rating is complete, rating data are stored in database 84 in store rating step 109 and the rules and regulations of the service are displayed in display rules step 104. Clicking on the Accept and Agree choice on the display rules page in indicate agreement step 105 automatically confirms the registration. In a preferred embodiment, an e-mail confirmation of registration is sent to the RH. The confirmation e-mail contains a link to a web page upon which the RH can change its password.

Referring to FIG. 12, a schematic flow diagram of a portion of the Duet™ meal process of a preferred embodiment of business method 90 is presented. Only registered households have access in access Duet™ meal menus step 110 to a greeting page where the Duet™ meal menus can be viewed. On the greeting page, the registered household has four options. In view current menus step 11, the Duet™ meal menus for the current week are displayed, which meals closed for ordering. These are the Duet™ meal menus that have been ordered the previous week and are now being delivered.

Figure 13:
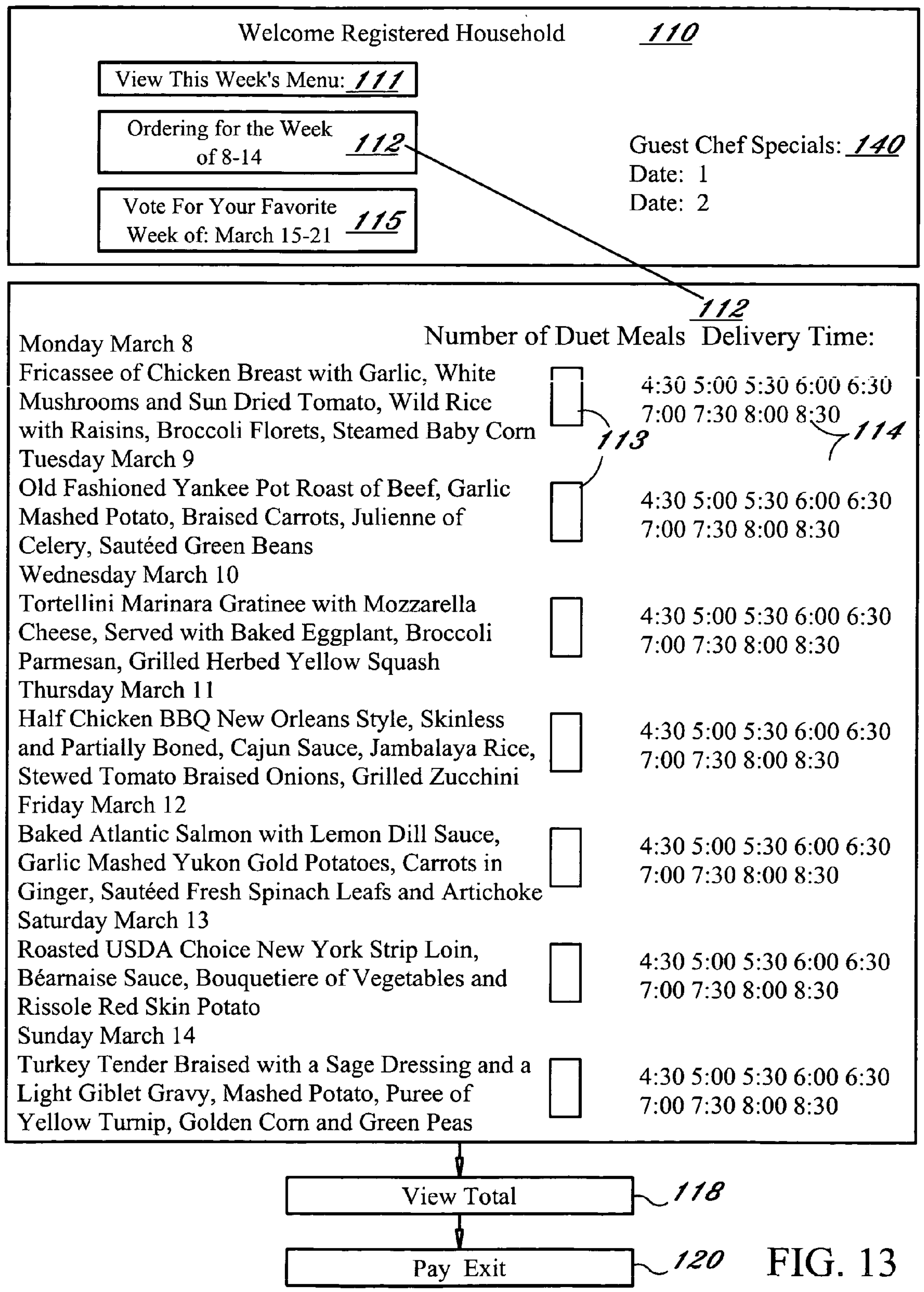
FIG. 13 is a schematic flow diagram of another portion of the Duet™ meal process of a preferred embodiment of the invention.

Referring to FIG. 13, a schematic flow diagram of another portion of the Duet™ meal process of a preferred embodiment of business method 90 is presented. In Duet™ meal ordering step 112, the registered household is presented with the Duet™ meal choices for the next week and can indicate the number of Duet™ meals to be delivered in indicate number step 113 and the best delivery time window in indicate time step 114. When the registered household is finished ordering, the order summary is displayed in display total step 118 and payment is made in pay step 120.

Figure 14A:
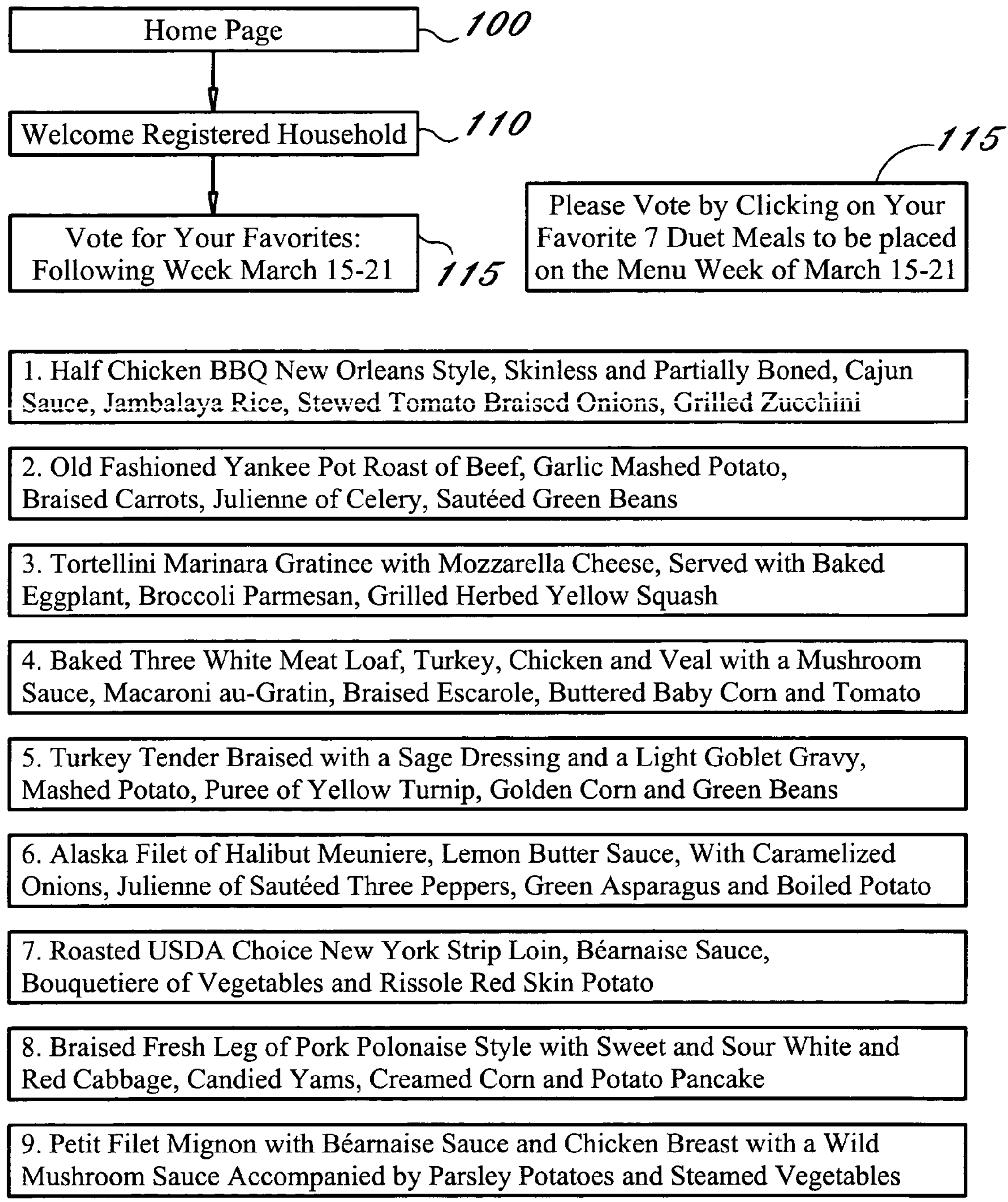
FIG. 14A is the first part of a schematic flow diagram of another portion of the Duet™ meal process of a preferred embodiment of the invention.

For a Duet™ meal to be placed on a weekly menu, it is preferably selected by most of the registered households in the zone. Periodically, e-mails are send to all registered households to notify them of the posting of a new list of dishes to be voted on as potential choices for the coming weeks. Referring to FIGS. 14A and 14B, a schematic flow diagram of another portion of the Duet™ meal process of a preferred embodiment of business method 90 is presented. In voting step 115, the registered household is presented with a listing of potential Duet™ meal menus for a coming week (e.g., the week after next) and can vote for the seven Duet™ meals that are the registered household's favorites. The results of the voting process are presented in view results step 116. The menu for the coming week is finalized by considering all votes received by a specified date. The final menu is preferably e-mailed to all the registered households in the zone. Referring to FIG. 15, the final menu with the seven Duet™ meals (one for each day of the week) ready for orders to be placed in steps 113, 114, 118 and 120.

Referring to FIG. 16, a schematic flow diagram of the Guest Chef Program of a preferred embodiment of business method 90 is presented. The Guest Chef Program is reserved for registered households only and is access via order guest chef special step 140. Special notices are sent by e-mail to the registered households in the zone to encourage viewing of signature dishes 141, 142, 143 and voting on one of them by a specified date to select the most favored signature dish. The signature dish with the most votes is then posted on the website as one of the Duet™ meal dishes and orders are taken.

Figure 17:
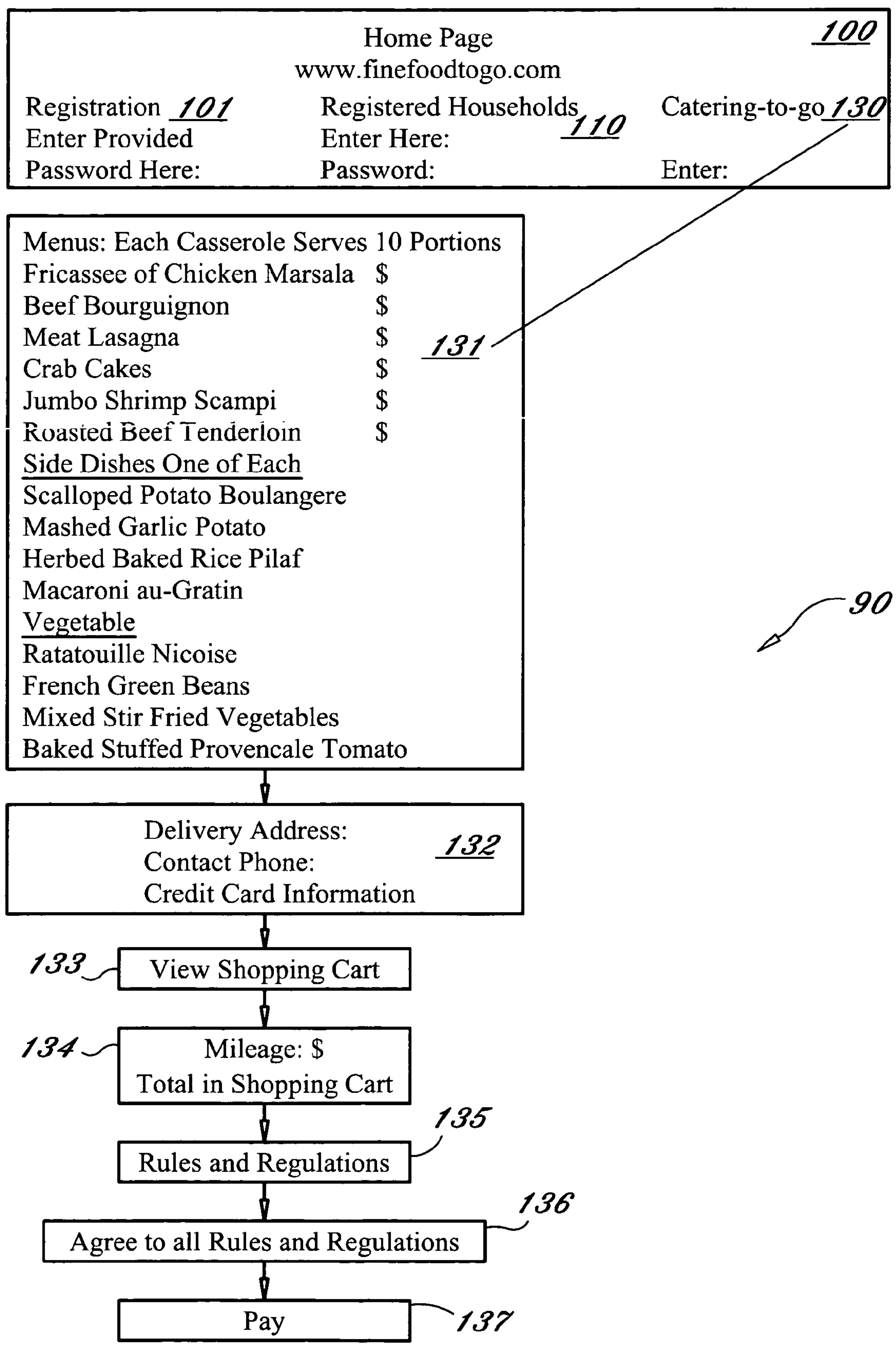
FIG. 17 is a schematic flow diagram of the catering-to-go process of a preferred embodiment of the invention.

Referring to FIG. 17, a schematic flow diagram of the catering-to-go process of a preferred embodiment of business method 90 is presented. Access to catering-to-go choices is available by catering-to-go step 130 to anyone who clicks on the catering-to-go choice on the home page. This action displays the catering menu and prices in make catering choices step 131. By clicking on an item, a complete description and picture of the chosen dish is displayed. To place an order, a main dish is chosen with one of each side dish and one vegetable that are included in the price. In enter delivery address step 132, the desired delivery address is entered along with a zip code that the system is programmed to use to determine the delivery cost according to the delivery distance. In view shopping cart step 133, the total order is displayed. After agreement is obtained from the user, a cost summary is presented in view total charges step 134. The rules and regulations are agreed to in agree to rules step 136 and payment is made in pay step 137.

Figure 18:
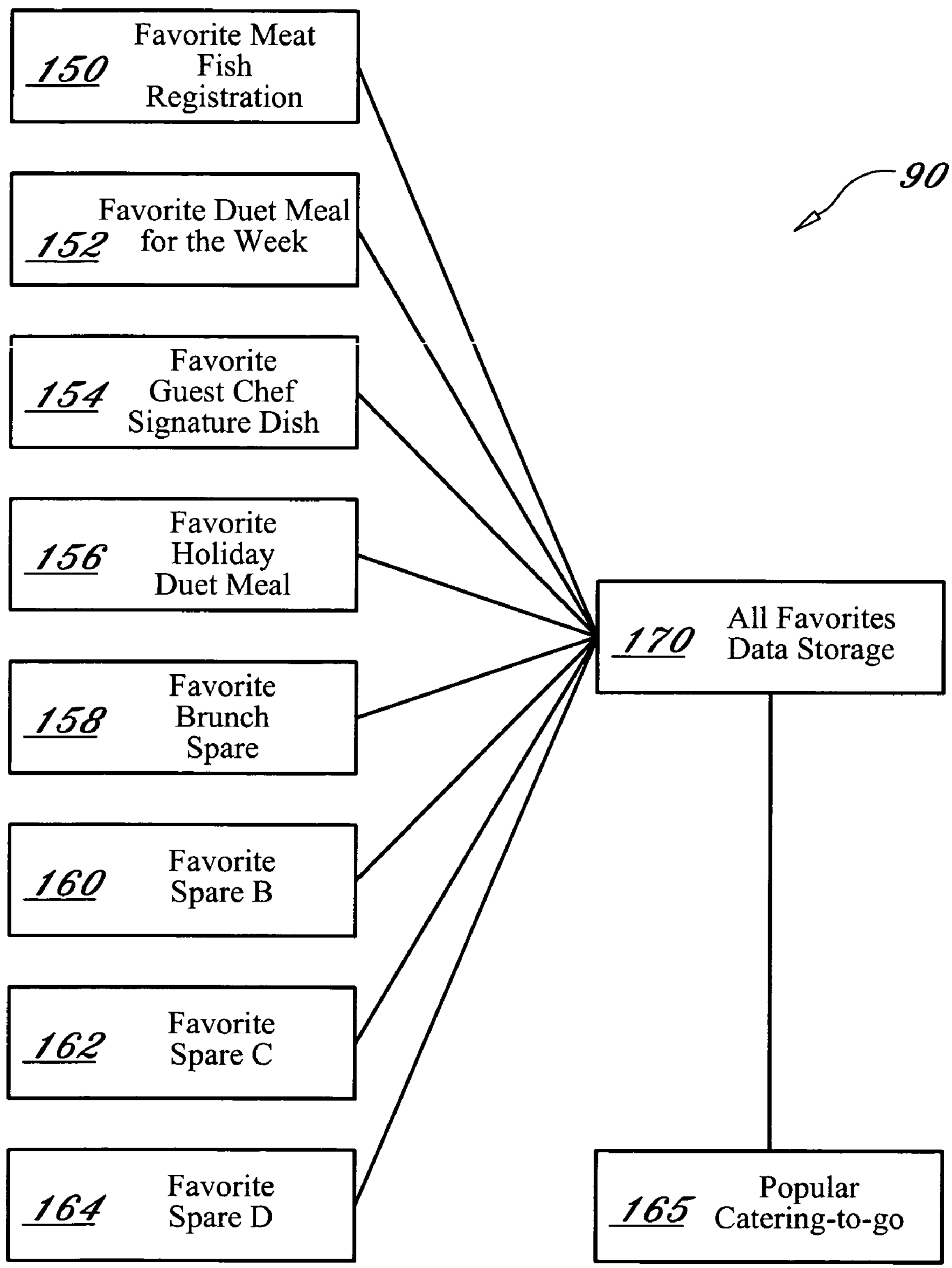
FIG. 18 is a schematic flow diagram of the favorites data structure of a preferred embodiment of the invention.

Referring to FIG. 18, a schematic diagram of the favorites data structure in a preferred embodiment of business method 90 is presented. In this embodiment, the favorite choices of the users of the system are stored in all favorites data storage 170. Favorites include favorite meat and fish at registration 150, favorite Duet™ meal for the week 152, favorite guest chef signature dish 154, favorite holiday Duet™ meal 156, favorite brunch spare 158, favorite spare B 160, favorite spare C 162, favorite spare D 164 and popular catering-to-go choice 165. This allows analysis of favorites data for dish planning purposes.

Many variations of the invention will occur to those skilled in the art. Some variations include the food carrier disclosed herein. Other variations call for the business method disclosed herein. All such variations are intended to be within the scope and spirit of the invention.

Although some embodiments are shown to include certain features, the applicant(s) specifically contemplate that any feature disclosed herein may be used together or in combination with any other feature on any embodiment of the invention. It is also contemplated that any feature may be specifically excluded from any embodiment of an invention.

What is claimed is:

1. A method for operating a food preparation and delivery service, said method comprising:

inviting a plurality of households within a delivery zone to register for the service by mailing a password to each selected household within said delivery zone via U.S. mail;

accepting a first input from a particular selected household via a website, said first input comprising the password, a name and address for said particular selected household, a rating of the favorite foods of said particular selected household and an agreement that said particular selected household will comply with a plurality of rules of the service, and storing said first input;

at the request of said particular selected household, displaying a menu for each day in a current time period via said website, each said menu being capable of serving about two people;

at the request of said particular selected household, displaying a dish for each day in a first future time period via said website, accepting a first order from said particular selected household for delivery of one or more portions of said dish at a desired time and a payment for said first order, and storing said first order;

at the request of said particular selected household, displaying a list of possible menus for a second future time period, accepting a second input from said particular selected household of a vote identifying the favored dishes of said particular selected household on said list and storing said second input; and at the request of said particular selected household, displaying a description of a plurality of guest chef signature specials, accepting a third input from said particular selected household of a favorite signature special and storing said third input.

2. The method of claim 1 further comprising:

at the request of any household, displaying a plurality of catering-to-go choices, accepting a fourth input comprising a selected choice and a zip code of said any household and storing said fourth input; and using said zip code to determine a delivery distance and calculating a delivery cost based on said delivery distance.

3. The method of claim 1 further comprising:

delivering said dish to said particular selected household in a food carrier that is adapted for reuse by the food preparation and delivery service.

4. The method of claim 1 further comprising:

delivering said dish to said particular selected household.

5. The method of claim 1 further comprising:

delivering said dish to said particular selected household in said delivery zone.

6. A method for operating a food preparation and delivery service, said method comprising:

a step for inviting a plurality of households within a delivery zone to register for the service by providing a password to each selected household within said delivery zone;

a step for accepting a first input from a particular selected household via a website, said first input comprising the password, a name and address for said particular selected household, an agreement that said particular selected household will comply with a plurality of rules of the service, and storing said first input;

a step for, at the request of said particular selected household, displaying a dish for each day in a first future time period via a said website, accepting a first order from said particular selected household for delivery of one or more portions of said dish at a desired time and a payment for said first order, and storing said first order;

a step for, at the request of said particular selected household, displaying a list of possible menus for a second future time period via a said website, accepting a second input from said particular selected household of a vote identifying the favored dishes of said particular selected household on said list and storing said second input; and a step for delivering said dish to said particular selected household.

7. A food preparation and delivery service, said food preparation and delivery service comprising:

means for allowing a plurality of households within a delivery zone to register for the service by providing a password to each selected household within said delivery zone, said delivery zone consisting of all the communities to be served from a particular centrally-located production kitchen;

means for accepting a first input from a particular selected household via a website, said first input comprising the password, a name and address for said particular selected household, an agreement that said particular selected household will comply with a plurality of rules of the service, and storing said first input;

means for, at the request of said particular selected household, displaying a dish for each day in a first future time period via said website, accepting a first order from said particular selected household for delivery of one or more portions of said dish at a desired time and a payment for said first order, and storing said first order;

means for, at the request of said particular selected household, displaying a list of possible menus for a second future time period via a said website, accepting a second input from said particular selected household of a vote identifying the favored dishes of said particular selected household on said list and storing said second input; and means for delivering said dish to said particular selected household.

8. A method for operating a food preparation and delivery service, said method comprising:

inviting a plurality of households within a delivery zone to register for the service by providing a password to each selected household within said delivery zone;

accepting a first input from a particular selected household via a website, said first input comprising the password, a name and address for said particular selected household, an agreement that said particular selected household will comply with a plurality of rules of the service, and storing said first input to produce a registered household;

at the request of said registered household, displaying a dish for each day in a first future time period via a said website, accepting a first order from said registered household for delivery of one or more portions of said dish at a desired time and a payment for said first order, and storing said first order; and at the request of said registered household, displaying a list of possible menus for a second future time period via a said website, accepting a second input from said registered household of a vote identifying the favored dishes of said registered household on said list and storing said second input.

9. A method for operating a food preparation and delivery service, said method comprising:

inviting a plurality of households within a delivery zone to register for the service;

at the request of a particular selected household, displaying a dish via a website for each day in a first future time period, accepting an order as a first input from said particular selected household for delivery of one or more portions of said dish at a desired time and a payment for said first order, and storing said first input; and at the request of said particular selected household, displaying a list of possible menus via a said website for a second future time period, accepting a second input from said particular selected household of a vote identifying the favored dishes of said particular selected household on said list and storing said second input.

10. A method for operating a food preparation and delivery service, said method comprising:

inviting a plurality of households within blocks in a delivery zone to register for the service;

accepting a registration and associating a registered household with a particular block;

at the request of a registered household, displaying a meal for each day in a first future time period on a mobile computing device or a personal computer that is connected to a network, accepting an order as a first input from said registered household for delivery of one or more portions of said meal at a desired time and a payment for said first order, and storing said first input;

in response to a notification, displaying a list of possible future meals on said mobile computing device or said personal computer for a second future time period, accepting a second input from said registered household of a vote identifying the favored possible future meals of said registered household on said list and storing said second input;

delivering said order to said registered household; and considering said vote in deciding which meals to offer to said registered household in said second future time period.

11. The method of claim 10 wherein said delivery zone comprises areas to be served by a single production kitchen.

12. The method of claim 10 wherein said inviting step comprises using the U.S. postal system to deliver the invitations.

13. The method of claim 10 wherein said particular block comprises a plurality of registered households, deliveries to which can be accomplished in a single delivery window.

14. The method of claim 10 wherein said notification is made in an email message.

15. The method of claim 10 wherein said network is the Internet.

* * * * *